United States Patent
Eggleton et al.

(10) Patent No.: US 6,275,629 B1
(45) Date of Patent: Aug. 14, 2001

(54) OPTICAL GRATING DEVICES WITH ADJUSTABLE CHIRP

(75) Inventors: Benjamin John Eggleton, Summit; John A. Rogers, New Providence; Thomas Andrew Strasser, Warren, all of NJ (US)

(73) Assignee: Lucent Technologies Inc., Murray Hills, NJ (US)

( * ) Notice: Subject to any disclaimer, the term of this patent is extended or adjusted under 35 U.S.C. 154(b) by 0 days.

(21) Appl. No.: 09/183,048

(22) Filed: Oct. 30, 1998

Related U.S. Application Data

(63) Continuation-in-part of application No. 09/151,794, filed on Sep. 11, 1998, now Pat. No. 6,097,862.

(51) Int. Cl.⁷ .................................................. G02B 6/34
(52) U.S. Cl. .................................................. 385/37; 385/10
(58) Field of Search ........................................ 385/37, 10

(56) References Cited

U.S. PATENT DOCUMENTS

| | | | |
|---|---|---|---|
| 5,042,898 | * | 8/1991 | Morey et al. ........................... 385/37 |
| 5,159,601 | * | 10/1992 | Huber ....................................... 372/6 |
| 5,502,782 | * | 3/1996 | Smith ...................................... 385/7 |
| 5,671,307 | * | 9/1997 | Lauzon et al. ........................... 385/37 |
| 5,694,501 | | 12/1997 | Alavie et al. . |
| 5,757,540 | * | 5/1998 | Judkins et al. ......................... 359/341 |
| 5,841,920 | * | 11/1998 | Lemaire et al. ........................ 385/37 |
| 5,987,200 | * | 11/1999 | Fleming et al. ........................ 385/37 |
| 6,097,862 | * | 8/2000 | Abramov et al. ...................... 385/37 |

FOREIGN PATENT DOCUMENTS 10221658    8/1998    (JP) .

OTHER PUBLICATIONS

Rogers, J.A., et al., "Distributed On–Fiber Thin Film Heaters for Bragg Gratings With Adjustable Chirp", May 24, 1999, Applied Physics Letters, pp. 3131–3133.

* cited by examiner

*Primary Examiner*—John D. Lee
*Assistant Examiner*—Jennifer Doan
(74) *Attorney, Agent, or Firm*—Lowenstein Sandler PC

(57) ABSTRACT

In accordance with the invention, an optical waveguide grating with adjustable chirp comprises a waveguide grating in thermal contact with an electrically controllable heat-transducing body which varies the temperature along the length of the grating. The heat-transducing body can generate heat on the fiber or remove heat from the fiber to establish a temperature gradient along the grating. In an exemplary embodiment, the heat-transducing body is a resistive film coating whose local resistance varies along the length of the grating. Electrical current passed through the film generates a temperature gradient along the grating approximately proportional to the local resistance of the film, and the amount of chirp can be adjusted by the current. The resulting devices are simple, compact and power efficient.

12 Claims, 8 Drawing Sheets

- PROVIDE WAVEGUIDE INCLUDING GRATING — A
- COAT GRATING REGION WITH VARYING RESISTANCE FILM — B
- PACKAGE DEVICE — C

OPTICAL GRATING DEVICES WITH ADJUSTABLE CHIRP

CROSS REFERENCE TO RELATED APPLICATIONS

This application is a continuation-in-part of U.S. application Ser. No. 09/151,794 filed Sep. 11, 1998 by Anatoli Abramov et al. and entitled "Optical Fiber Grating Devices With Enhanced Sensitivity Cladding For Reconfigurability." Application Ser. No. 09/151,794 issued as U.S. Pat. No. 6,097,862 on Aug. 1, 2000.

FIELD OF THE INVENTION

The present invention relates to optical grating devices, and in particular it concerns optical waveguide gratings having electrically adjustable chirp.

BACKGROUND OF THE INVENTION

Optical fibers are key components in modern telecommunication systems. Basically, an optical fiber is a thin strand of glass capable of transmitting optical signals containing a large amount of information over long distances with very low loss. In its simplest form, it is a small diameter waveguide comprising a core having a first index of refraction surrounded by a cladding having a second (lower) index of refraction. Typical optical fibers are made of high purity silica with minor concentrations of dopants to control the index of refraction.

Optical gratings are important elements for selectively controlling specific wavelengths of light within optical systems such as optical communication systems. Such gratings include Bragg gratings and long period gratings. Gratings typically comprise a body of material and a plurality of substantially equally spaced optical grating elements such as index perturbations, slits or grooves. The ability to dynamically modify these gratings would both be highly useful.

A typical Bragg grating comprises a length of optical waveguide, such as optical fiber, including a plurality of perturbations in the index of refraction substantially equally spaced along the waveguide length. These perturbations selectively reflect light of wavelength $\lambda$ equal to twice the spacing $\Lambda$ between successive perturbations times the effective refractive index, i.e. $\lambda = 2n_{eff}\Lambda$, where $\lambda$ is the vacuum wavelength and $n_{eff}$ is the effective refractive index of the propagating mode. The remaining wavelengths pass essentially unimpeded. Such Bragg gratings have found use in a variety of applications including filtering, adding and dropping signal channels, stabilization of semiconductor lasers, reflection of fiber amplifier pump energy, and compensation for waveguide dispersion.

Waveguide Bragg gratings are conventionally fabricated by doping a waveguide core with one or more dopants sensitive to ultraviolet light, e.g., germanium or phosphorous, and exposing the waveguide at spatially periodic intervals to a high intensity ultraviolet light source, e.g., an excimer laser. The ultraviolet light interacts with the photosensitive dopant to produce long-term perturbations in the local index of refraction. The appropriate periodic spacing of perturbations to achieve a conventional grating can be obtained by use of a physical mask, a phase mask, or a pair of interfering beams.

The performance of high speed WDM lightwave systems depends critically on the details of the system design and particularly on the level of in-line dispersion and dispersion slope compensation as well as nonlinear effects occurring in the dispersion compensated fiber (DCF). In such systems small variations in optical power, due for example to imperfect gain flattening, can result in additional nonlinear phase shift that can modify the optimal dispersion map of the system. This problem is exacerbated by a reduced dispersion budget associated with imperfect dispersion slope compensation over a wide bandwidth of operation. For example, in a typical system operating with approximately 40 nm of bandwidth, and with an uncompensated dispersion slope of 0.05 ps/nm$^2$.km, the accumulated divergence in the dispersion (assuming approximately 60% compensation in dispersion compensating fiber), is thus approximately 1.2 ps/nm.km. The corresponding dispersion budget is typically taken as twice this value giving 2.4 ps/nm.km. It follows that the maximum transmission distance (L) that can be achieved before incurring a significant penalty, is given $L < 104,000/(B)^2|D|$ (Gb/s)$^2$ ps/nm (1) where B is the channel rate and D the dispersion of the fiber, is 32 km for a 40 Gbit/s system and 512 km for a 10 Gbit/s system. Thus while many anticipate the need for dynamic dispersion compensation at 40 Gbits/s clearly some 10 Gbits/s systems will benefit from this as well. Dispersion compensating devices that provide dynamically adjustable dispersion and that can be incorporated directly into the fiber are thus particularly attractive.

In conventional Bragg gratings the dispersions and reflective properties are static. Each grating selectively reflects only light in a narrow bandwidth centered around $m\lambda = 2n_{eff}\Lambda$, where $m = 1,2,3 \ldots$ is the order of the grating. However for many applications, such as dispersion compensation, it is desirable to have gratings which can be controllably altered in bandwidth and/or dispersion.

Chirped waveguide gratings are promising elements for compensating system dispersion. Chirped Bragg gratings operated in reflection can provide necessary dispersion. However most waveguide Bragg gratings are not readily adjustable, meaning that they are not easily tuned or adjusted after fabrication, non-linear chirping is difficult to achieve, and currently available devices are not well suited for small size, low power applications.

One attempt to induce dynamically adjustable chirp on a waveguide Bragg grating involves setting the waveguide in a groove in an elongated plate and imposing a temperature gradient on the plate. See U.S. Pat. No. 5,671,307 issued to J. Lauzon et al, on Sep. 23, 1997. This arrangement, however, has a number of shortcomings:

(a) It is bulky and not easily compatible with existing packaging technologies.

(b) Because of this bulkiness the device is power inefficient, and adds a latency to the dynamic response of the device. Power is required to heat the elongated plate, which can be much larger than the fiber itself.

(c) There is significant heat transfer to the surrounding environment because heat must be continuously supplied to support constant heat flow along the plate.

(d) It is difficult to prescribe complex/arbitrary temperature gradients and thus complex dispersions. The heat sink and heat source allow for only a linear temperature gradient. In many cases, however, nonlinear temperature gradients are required for producing nonlinear chirps.

Controllable chirping is also potentially useful for long-period gratings. Long-period fiber grating devices provide wavelength dependent loss and may be used for spectral shaping. A long-period grating couples optical power between two copropagating modes with very low back reflections. It typically comprises a length of optical waveguide wherein a plurality of refractive index perturbations are spaced along the waveguide by a periodic distance $\Lambda'$ which is large compared to the wavelength $\lambda$ of the transmitted light. In contrast with conventional Bragg gratings, long-period gratings use a periodic spacing $\Lambda'$ which is typically at least 10 times larger than the transmitted wavelength, i.e. $\Lambda' \geq 10\lambda$. Typically $\Lambda'$ is in the range 15–1500 micrometers, and the width of a perturbation is in the range $\frac{1}{5} \Lambda'$ to $\frac{4}{5} \Lambda'$. In some applications, such as chirped gratings, the spacing $\Lambda'$ can vary along the length of the grating.

Long-period gratings are particularly useful for equalizing amplifier gain at different wavelengths of an optical communications system. See, for example, U.S. Pat. No. 5,430,817 issued to A. M. Vengsarkar on Jul. 4, 1995.

Conventional long-period gratings are permanent and narrowband. Each long-period grating with a given periodicity ($\Lambda'$) selectively filters light in a narrow bandwidth centered around the peak wavelength of coupling, $\lambda_p$. This wavelength is determined by $\lambda_p = (n_g - n_{ng}) \Lambda'$ where $n_g$ and $n_{ng}$ are the effective indices of the core and the cladding modes, respectively. The value of $n_g$ is dependent on the core and cladding refractive index while $n_{ng}$ is dependent on core, cladding and ambient indices. Adjustable chirp long-period gratings could be highly useful for compensating gain spectrum change.

Accordingly there is a need for improved optical waveguide grating devices with adjustable chirp.

SUMMARY OF THE INVENTION

In accordance with the invention, an optical waveguide grating with adjustable chirp comprises a waveguide grating in thermal contact with an electrically controllable heat-transducing body which varies the temperature along the length of the grating. The heat-transducing body can generate heat on the fiber or remove heat from the fiber to establish a temperature gradient along the grating. In an exemplary embodiment, the heat-transducing body is a resistive film coating whose local resistance varies along the length of the grating. Electrical current passed through the film generates a temperature gradient along the grating approximately proportional to the local resistance of the film, and the amount of chirp can be adjusted by the current. The resulting devices are simple, compact and power efficient.

BRIEF DESCRIPTION OF THE DRAWINGS

The nature, advantages and various additional features of the invention will appear more fully upon consideration of the illustrative embodiments now to be described in connection with the accompanying drawings. In the drawings.

It is to be understood that these drawings are for purposes of illustrating the concepts of the invention and are not to scale.

DETAILED DESCRIPTION

Figure 1A:
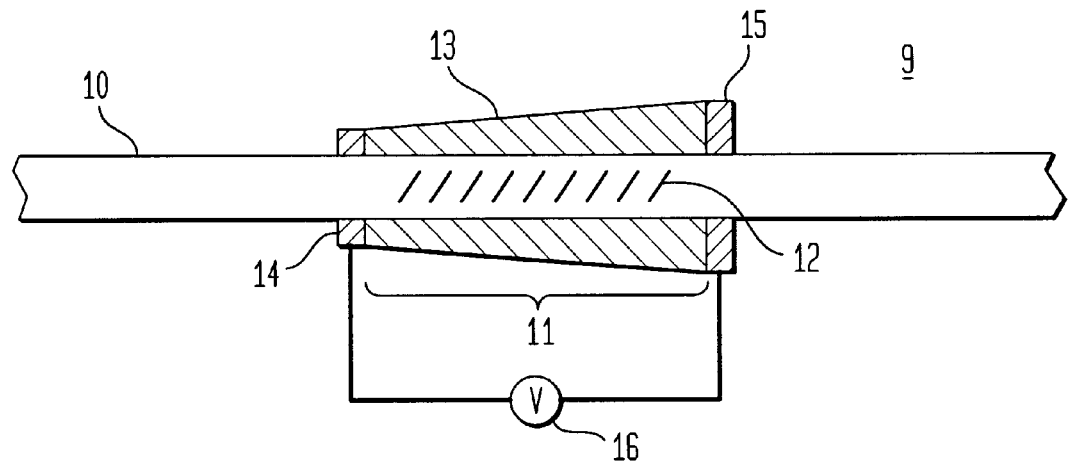
FIGS. 1(a) and 1(b) are schematic cross sections of waveguide grating devices with adjustable chirp.

Referring to the drawings, FIG. 1(a) illustrate an exemplary adjustable chirp waveguide grating device 9 comprising a length of optical waveguide 10 (here optical fiber) including an optical grating 11 comprising a sequence of index perturbations 12. The grating 11 is disposed in thermal contact with an electrically controllable heat-transducing body 13, which can be a heat-generating body or a body which actively removes heat. Here the body 13 is a heat-generating body such as a resistive film on the waveguide having a local resistance which varies along the length of the grating portion. The local resistance can be varied by varying the thickness of the film along the grating length. The resistance increases with decreasing film thickness. The resistance can also be varied by varying the composition. Electrode portions 14 and 15 can be provided to facilitate electrical contact with a power source 16 for passing current through the film along the length of the grating. The resistance of the film 13 preferably monotonically increases along a length (axial) direction of the grating to establish a substantially continuous temperature gradient when current is flowed along the film.

In operation, an electrical current driven by source 16 through the body 13 creates a temperature gradient along the grating which chirps the grating. For example, in the specific embodiment shown, current generates local resistive heating along the waveguide at rates which are proportional to the local resistance of the film (approximately inversely proportional to film thickness). This local heating establishes a temperature gradient along the grating which chirps the grating.

Alternatively, heat-transducing body 13 can comprise controllable cooling elements such as peltier coolers arranged to provide cooling which varies along the length of the grating. A temperature gradient produced by variable cooling can also be used to chirp a grating.

Figure 1B:
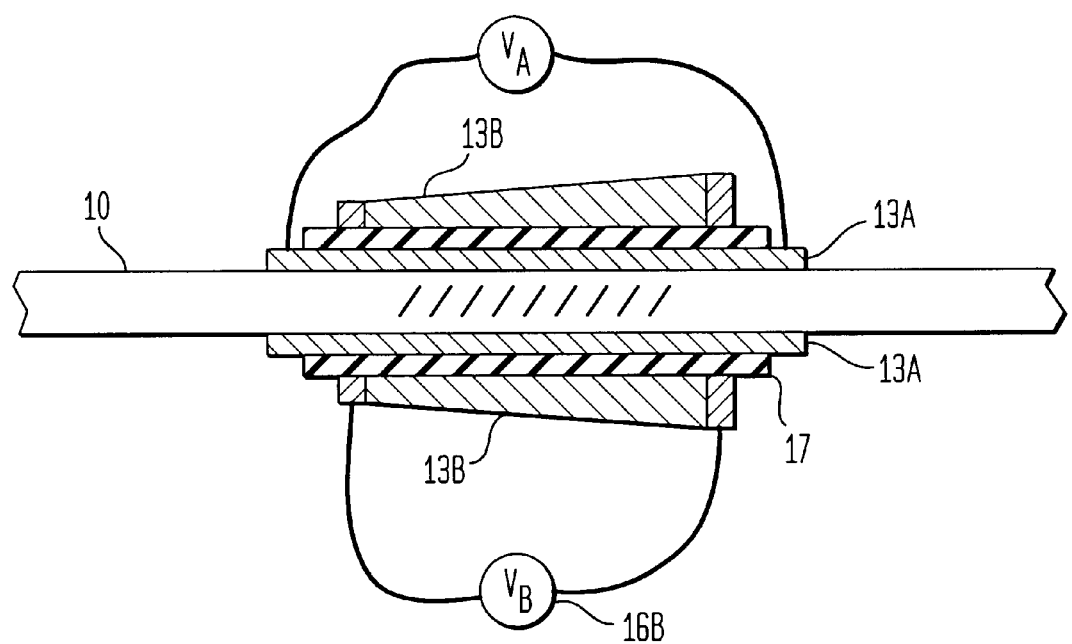

FIG. 1(b) shows an alternative embodiment wherein the heat-transducing body 13 is a composite structure comprising a uniform electrical resistance film 13(a) and a variable resistance film 13(b) similar to that described in connection with FIG. 1(a). The uniform resistance film 13(a) is advantageously separated from the variable resistance film 13(b) by an electrical insulator 17 such as a film of $SiO_2$, and heat-generating films 13(a) and 13(b) can be powered by separate voltage sources 16(a) and 16(b). Control of the power supplied to film 13(a) controls the center frequency of the grating, and the power supplied to film 13(b) adjusts the chirp.

Figure 2:
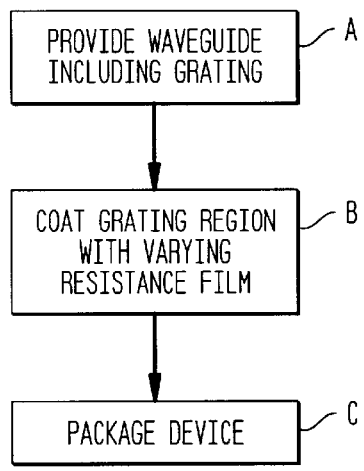
FIG. 2 is a block diagram illustrating the steps making the grating device of FIG. 1.

FIG. 2 is a block diagram showing steps useful in making the exemplary adjustable chirp gratings of FIGS. 1(a) and 1(b). As shown in block A, the first step is to provide a length of optical waveguide including an optical grating. The waveguide is preferably uncoated optical fiber but, in the case of the FIG. 1(b) embodiment, can include an electrically insulated resistive film of uniform resistance. The waveguide can be single mode or multimode. The grating can be a Bragg grating or a long period grating.

As a specific example, an apodized fiber Bragg grating (~5 cm long with peak reflection at ~1550 nm) was written into the core of photosensitive optical fiber using the phase mask scanning technique described, for example, in T. A. Strasser et al, Postdeadline Paper PD8, *Optical Fiber Communications conference*, 1996 OSA Technical Digest Series, Vol. 2 (Optical Society of America, Washington D.C. 1996).

The next step, shown in block B, is to coat on the waveguide a thin film of resistive material whose local resistance increases along the length of the grating in a substantially continuous manner. Preferably, the resistance increases in a monotonically increasing fashion.

Figure 3:
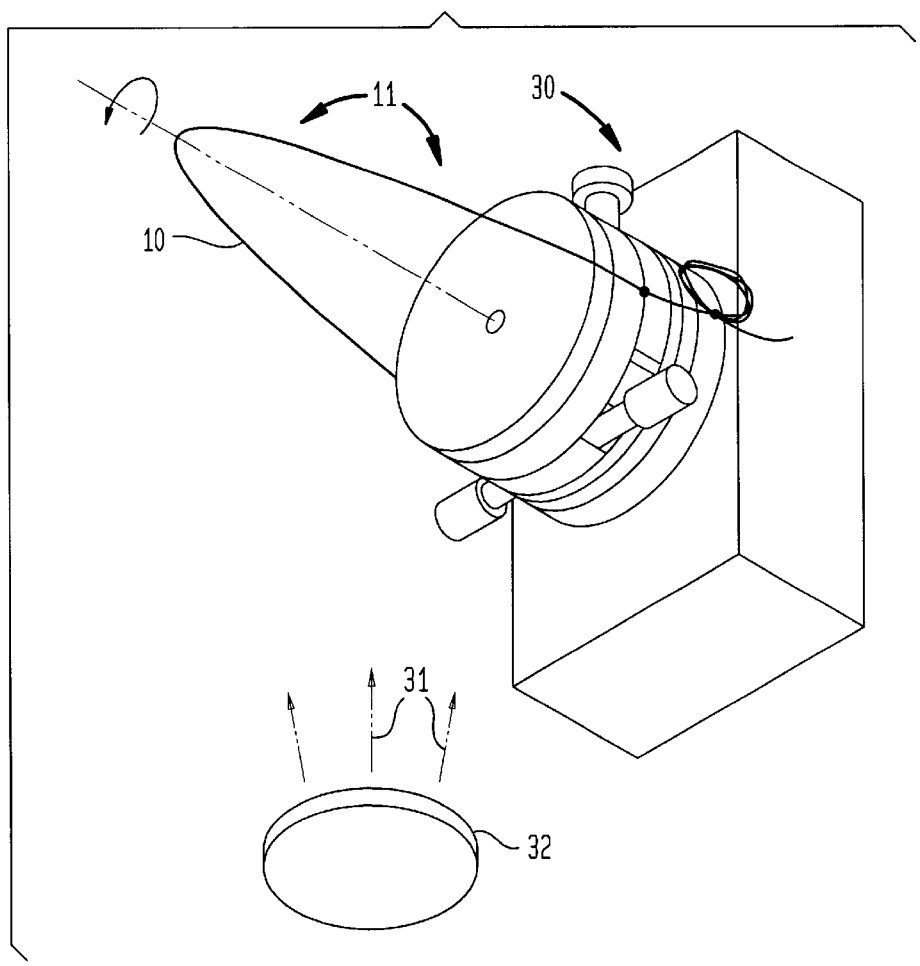
FIGS. 3–4 show apparatus useful in practicing the method of FIG. 2.
Figure 4:
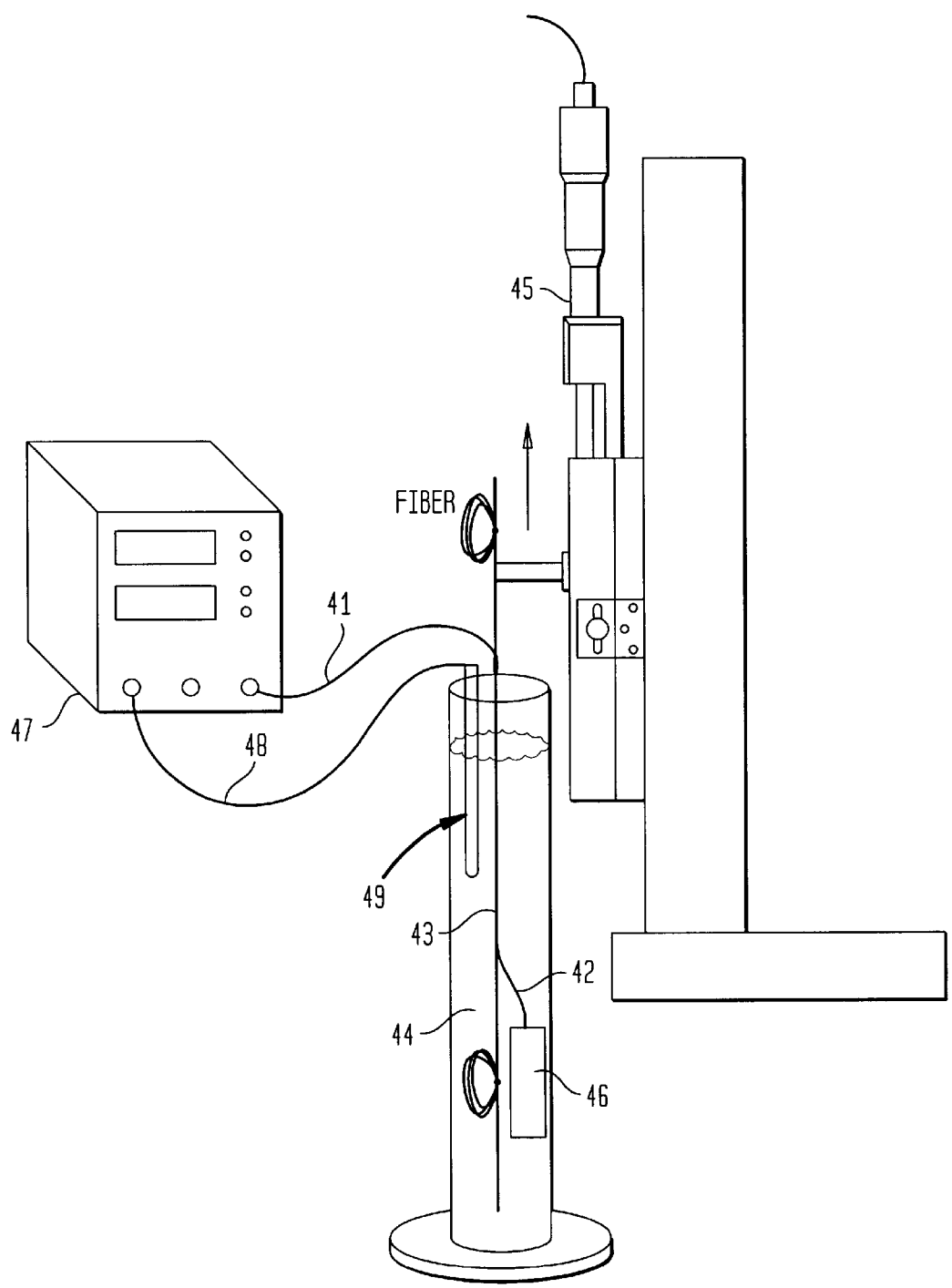

FIGS. 3 and 4 show apparatus useful in depositing a variable thickness layer along the grating. FIG. 3 illustrates the fiber 10 including the grating 11 (stripped of its polymeric coating) mounted on an automatic rotation stage 30 in position for receiving electron beam evaporated metal 31 from metal source 32. This arrangement produces a uniform metallic coating on the section of fiber containing the grating.

FIG. 4 shows apparatus for electroplating a variable thickness of silver along the grating length. The fiber 11 with thin wires 41, 42 attaches, as by silver epoxy, to the ends of the evaporated metal section 43 is disposed within an electroplating bath 44. A power supply 47 via wires 41 and 48 and electrode 49 provides current for electroplating the silver. The fiber is also secured to an automatic translation stage 45 for pulling the fiber from the bath 44. A gold-plated piece of a microscope slide 46 is attached to one end of the fiber to straighten the fiber during pulling and to minimize reductions in the total plating area caused by removing the fiber from the solution. Electrodeposition while the fiber is pulled at a fixed or variable rate from the bath produces a coating of silver whose thickness varies along the length of the fiber. Alternatively, the local resistance can be varied by changing the composition of a deposited coating along the length of a grating.

As a specific example, a fiber containing a grating is mounted on an automated rotation stage and placed in an electron beam evaporator. Evaporation of titanium (~100 Å, as adhesion promoter) and gold (~1500 Å) onto the fiber while it is rotating forms a uniform coating of metal on the entire outer surface of a stripped section of the fiber that contains the grating. Attaching fine wires to the ends of the stripped section with silver epoxy (SPI Supplies, Inc.) provides electrical connection for electrodeposition of silver. Pulling the fiber from an electroplating bath (Technic, Inc.) with a programmable translation stage while plating at constant current produces a controlled variation in the thickness of the silver. The electrodeposition was performed at room temperature on a ~15 cm long segment of fiber at a constant current of ~1.5 mA. The fiber was pulled from the electroplating bath at a constant rate of ~12 mm/min; for each sample, the deposition was repeated 4–5 times to increase the thickness of the silver. For most devices, the films varied in thicknesses over the grating region of the fiber from a minimum of 1–5 $\mu$m to a maximum of 10–30 $\mu$m. Resistances of a few ohms were typical.

Figure 5:
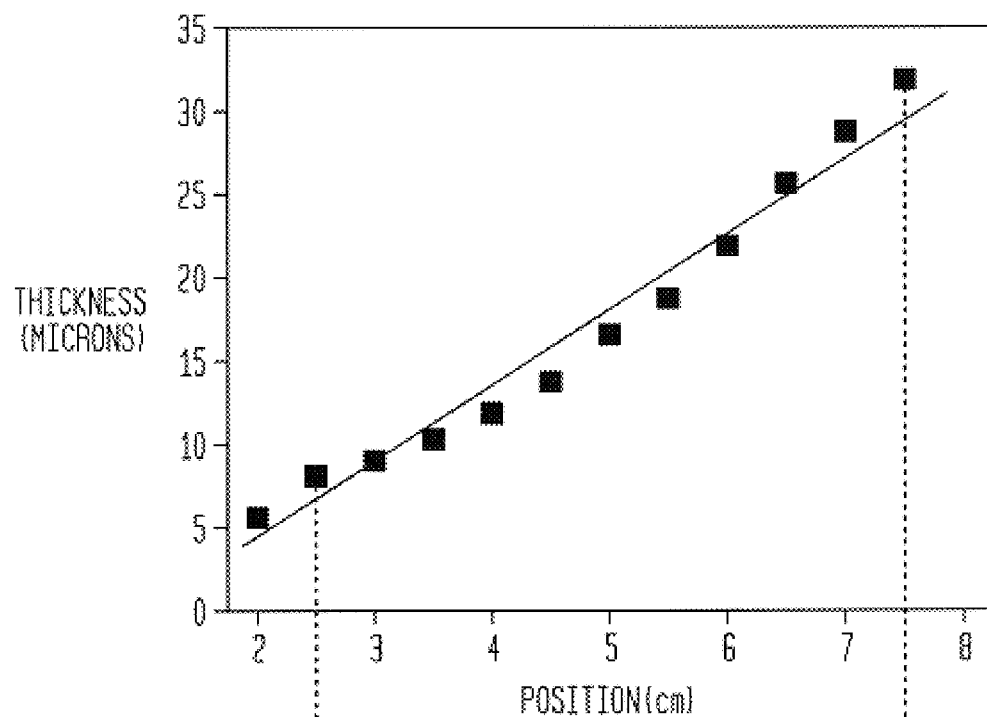
FIGS. 5, 6A, 6B, 7, 8A, 8B, 8C and 9 are illustrations showing the characteristics of a specific example of the FIG. 1 device.

FIG. 5 is a graphical illustration showing the thickness of a metal film plated onto a 6 cm length of optical fiber measured using an optical microscope at several locations along the fiber.

Figure 6A:
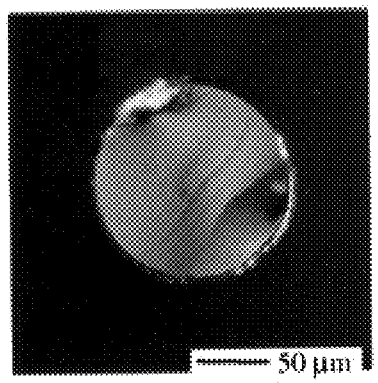
Figure 6B:
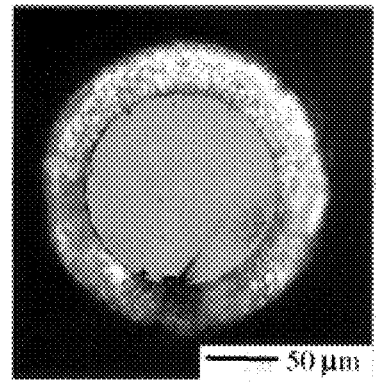

FIGS. 6(a) and 6(b) 5 show cross sectional optical micrographs of the ends of a fiber plated according to procedures above. For this particular sample, corresponding to the graph of FIG. 5, the thickness of the silver varies from 5 $\mu$m to 30 $\mu$m in a roughly linear fashion. This particular structure was fabricated with two coatings along the entire length of the fiber followed by four coatings along the thick half of the sample.

Figure 7:
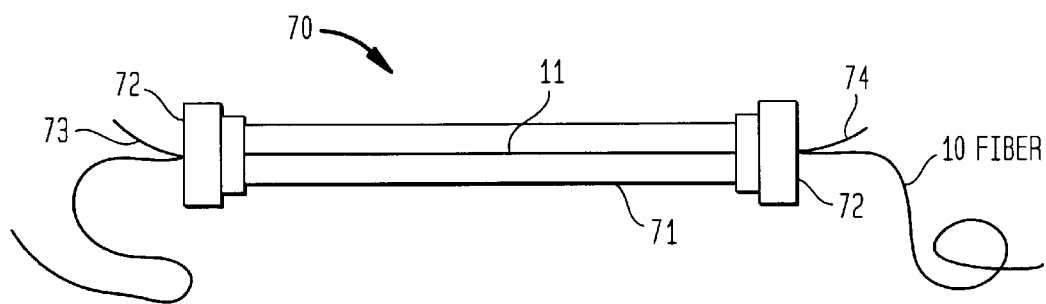

The third step (block C) (which is optional) is to package the device for operation. FIG. 7 shows an illustrative package arrangement 70 wherein the grating 11 is disposed within a capillary tube 71 sealed at both ends as with rubber stoppers 72. Wire 73 and 74 permit connection with an electrical source (not shown). The advantage of such packaging is to isolate the grating from thermal gradients such as air currents that can cause undesirable fluctuations in temperature during operation.

Figure 8A:
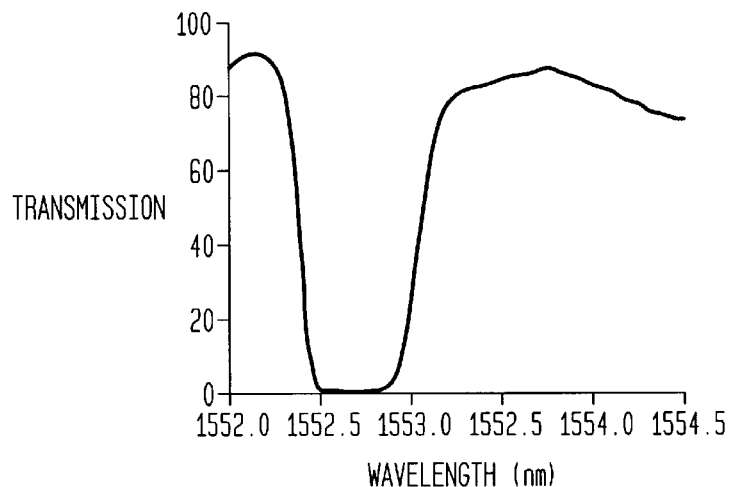
Figure 8B:
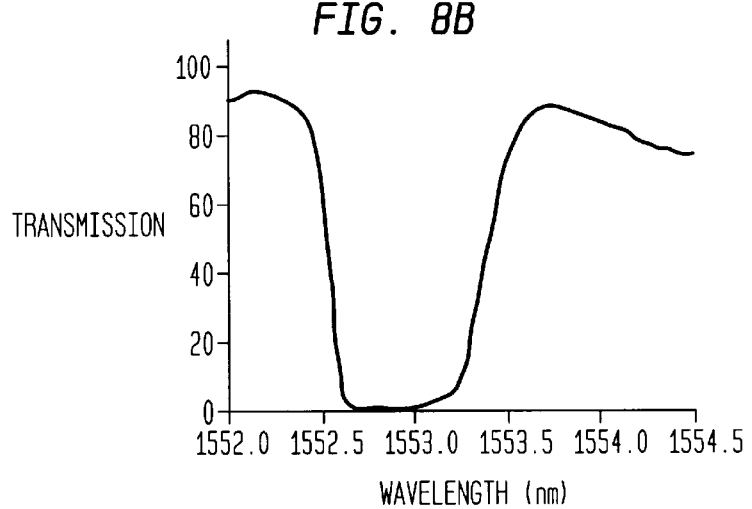
Figure 8C:
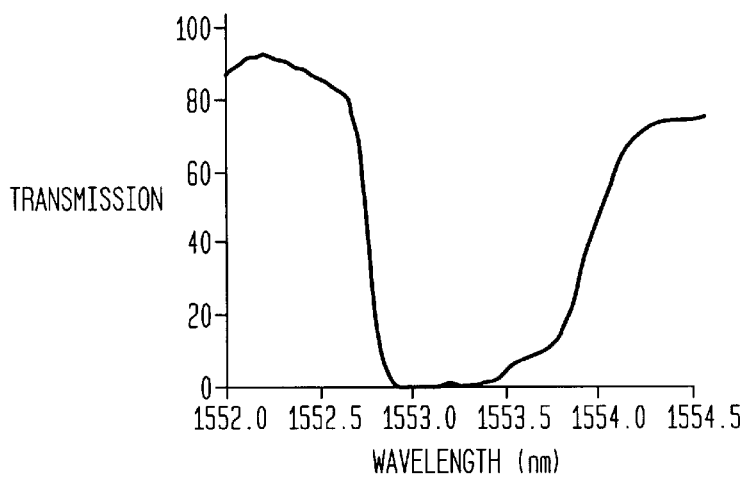

In operation of the device, the application of voltage across the length of resistive coating chirps the reflection band of the grating. FIGS. 8(a), 8(b) and 8(c) show the transmission spectra for a typical device at three different voltages (increasing from 8(a) to 8(c)). The uniform broadening in the transmission dip arises from heating that varies monotonically and smoothly along the length of the grating.

Figure 9:
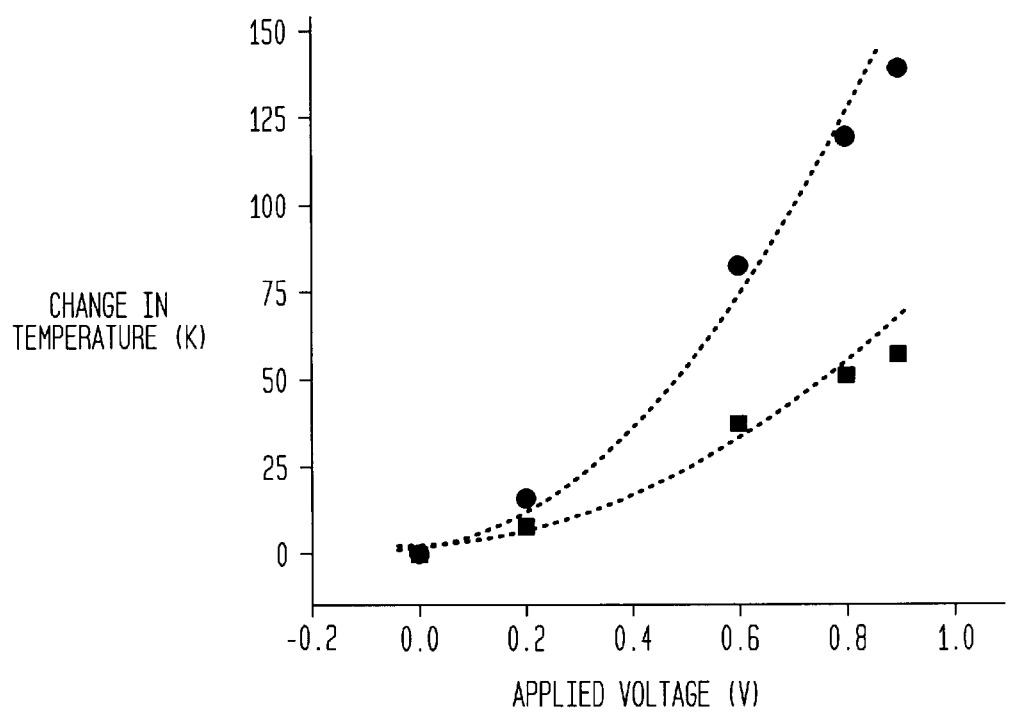

FIG. 9 is a graphical illustration showing the voltage dependence of the change in temperature at the two ends of a grating. The change in temperature is proportional to the square of the applied voltage, consistent with local resistive heating and loss of heat at a rate proportional to the change in temperature.

The adjustable chirp gratings described herein are especially useful in wavelength division multiplexed communication systems which employ multiplexer/demultiplexer devices. In such systems, a "trunk" fiber carries optical signal channels at several wavelengths $\lambda_1, \lambda_2, \ldots \lambda_n$ and it is desirable to extract a single wavelength channel from the trunk fiber or to add a single wavelength channel onto the trunk. A wide variety of such devices can be made by interconnecting optical circulators and fiber gratings. Typically the channel reflected by the grating is dropped to the trunk fiber or is added to the trunk. Gratings as described herein permit selection at the grating of which channel is dropped or added.

Figure 10:
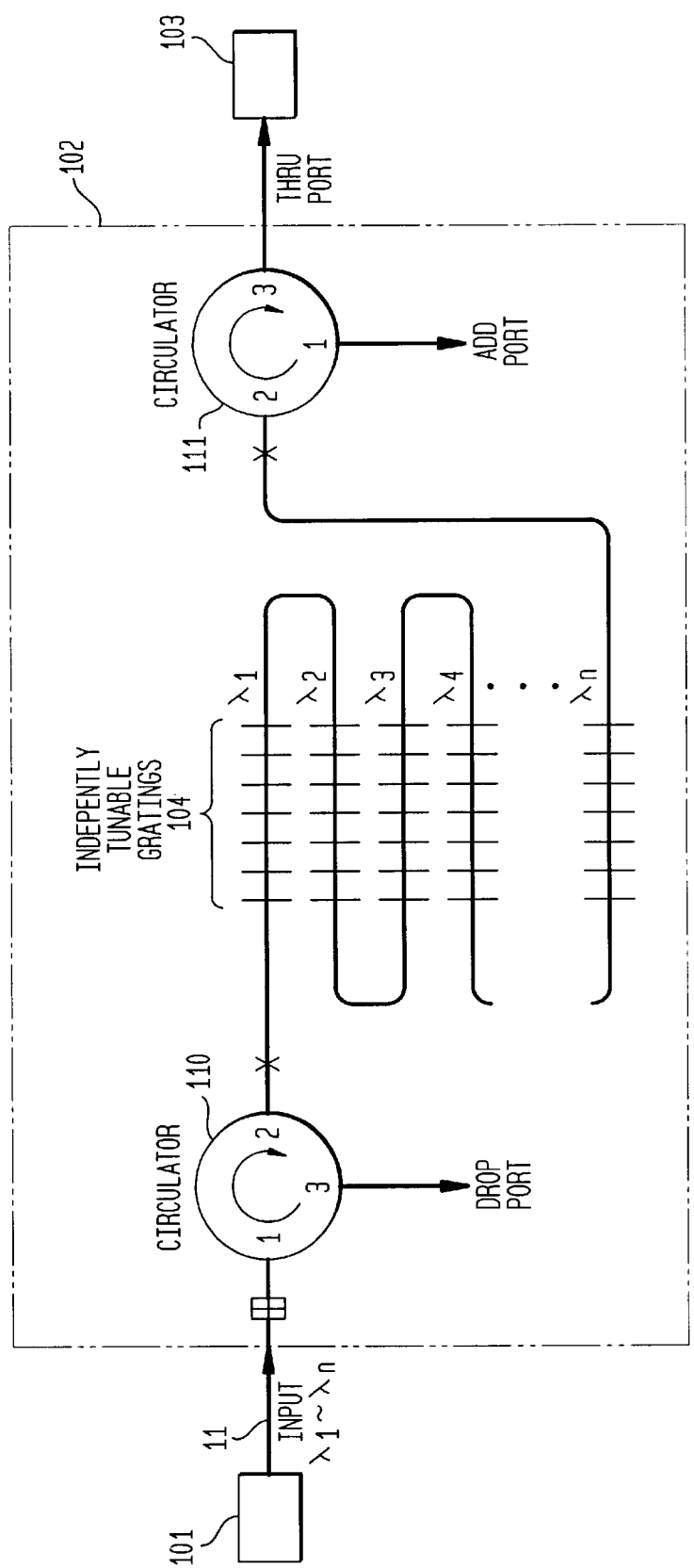
FIGS. 10–13 show applications of the device in communication systems.

FIG. 10 schematically illustrates a wavelength division multiplexed (WDM) communications system comprising a transmitter 101, an improved N-channel multiplexer 102 and a receiver 103, all connected by trunk fiber 11. The input on fiber 11 consists of optical signals at several wavelengths, $\lambda_1$ to $\lambda_n$. The multiplexer 102 is improved by the use of one or more adjustable chirp gratings 104 as described herein.

The multiplexer 102 comprises one or more pairs (here 1 pair) of circulators, comprising an upstream circulator 110 and a downstream circulator 111. A series of tunable gratings 104 are placed between the circulators, with their grating wavelengths located at between-channel wavelengths.

Figure 11:
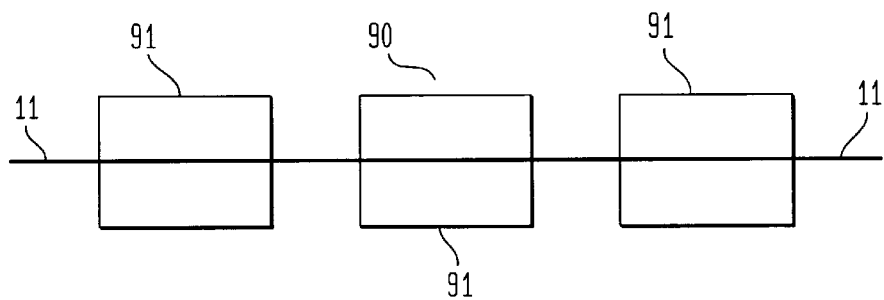

The adjustable chirp grating structure according to the present invention can also be applied to the long-period gratings for gain adjustment. As schematically illustrated in FIG. 11, tunable loss filter 90 covering a wider bandwidth than a single long-period grating device can be constructed by concatenating adjustable chirp long-period gratings 91 along a single fiber 11. A desired loss spectrum can be obtained by selectively adjusting the chirp of the gratings.

Figure 12:
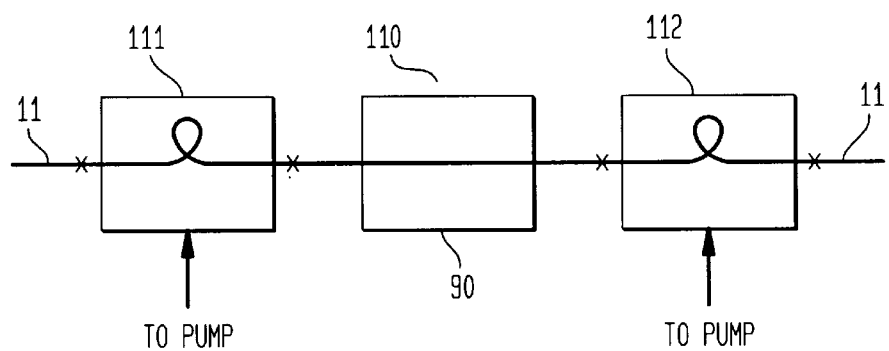

FIG. 12 illustrates a dynamically gain-flattened amplifier 110 made by including a tunable loss filter 90 composed of the adjustable chirp long-period gratings in a rare earth doped amplifier (such as an erbium-doped fiber amplifier). The amplifier 110 preferably comprises a plurality of rare-earth fiber amplifier stages (e.g. two stages 111 and 112) with the tunable loss filter 90 preferably disposed at the output of the first stage. This gives the highest power and the lowest noise figure. For applications where noise is less important the filter 90 can be placed in front of the first stage 111. For applications where power is less important, it can be placed at the output of the last stage 112. Long-period gratings for flattening the response of an amplifier are described, for example, in U.S. Pat. No. 5,430,817 issued to A. M. Vengsarkar on Jul. 4, 1995, which is incorporated herein by reference. Such devices 110 can be advantageously used in WDM optical communication systems to ensure equalized amplification under a wide variety of conditions.

Figure 13:
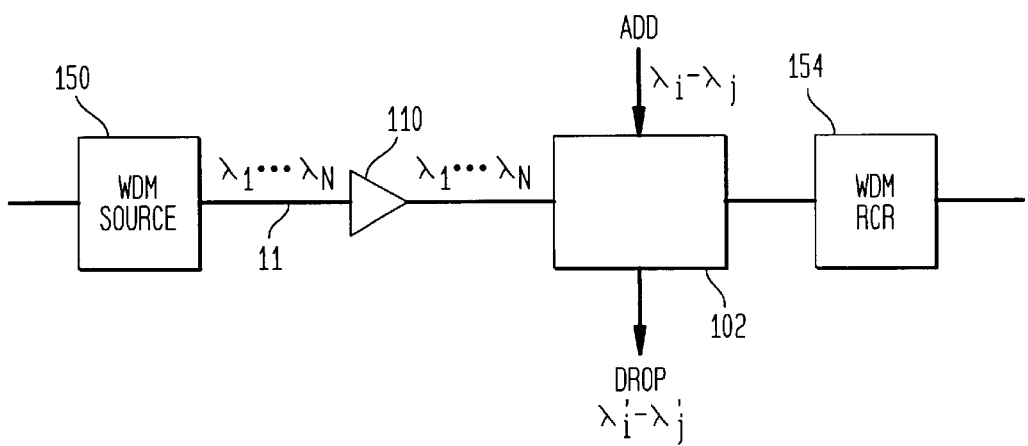

FIG. 13 schematically illustrates an optical WDM communication system comprising a source 150 of modulated WDM optical signal channels $\lambda_1, \lambda_2, \ldots \lambda_n$ along a trunk fiber 11. The channels pass through one or more gain equalized amplifiers 110, which can be gain flattened amplifiers as shown in FIG. 12 and through one or more ADD/DROP multiplexer devices 102, which can be ADD/DROP devices as shown in FIG. 10. The signals are received at one or more WDM receivers 154.

For extensions of the invention, the following represents applicants' best understanding of the theory underlying the invention. Non-linear finite element modeling was used to compute the steady state thermal distributions in operating devices with geometries like those described above. The calculations used adaptive mesh refinement and assumed radiative and convective heat loss at rates given by $\acute{o}E(T^4-T_o^4)$, and $A(T-T_o)^{5/4}$ respectively, where T is the temperature of the surface of the metal, $T_o$ is the temperature of the surroundings, $\sigma$ is the Stefan-Boltzmann constant, E is the emissivity of the surface of the metal, and A is a constant that characterizes natural convection in air. Intimate thermal contact between the heating film and the glass fiber was assumed, and the thickness of the metal coating varied between 5 and 20 microns. The important results are that (I) to a first approximation, the temperature distribution in the core of the fiber follows the distribution of heating power produced by the resistive film (i.e. the flow of heat along the length of the fiber does not seem to cause the shape of the temperature distribution to deviate strongly from the distribution of heating), and (ii) the increase in temperature is linearly related to the heating power (i.e. the flow of heat out of the fiber is approximately linear even though radiation and convection are strictly non-linear processes.) when these two results are valid, and when shifts in the Bragg resonance are linearly related to the change in temperature, then it is possible to write $$\Delta\lambda_B(x) \sim \Delta T(x) \sim I^2/t(x)$$

where $\Delta\lambda_B(x)$ is the shift of the Bragg resonance, x is the position along the grating, $\Delta T(x)$ is the change in temperature, t(x) is the thickness of the metal film, and I is the applied current. This equation represents a simple, approximate description of the behavior of these devices, and provides some guidance for engineering tunable grating structures with complex (i.e. non-linear) chirp.

In conclusion, the above-described results and theory demonstrates a design for Bragg fiber grating devices that use thermally adjustable chirp. The devices have attractive features that include power efficient operation, compact size, simple fabrication, controllable optical properties, and compatibility with other tuning schemes such as those that rely on mechanical strain.

It is to be understood that the above-descried embodiments are illustrative of only a few of the many possible specific embodiments which can represent applications of the principles of the invention. Numerous and varied other arrangements can be made by those skilled in the art without departing from the spirit and scope of the invention.

What is claimed:

1. An adjustable chirp optical waveguide grating comprising:

a length of optical waveguide including an optical grating comprising a sequence of index perturbations;

disposed in thermal contact with said waveguide along the length of said grating, an electrically controllable heat-transducing body, said body responsive to an applied electrical signal to vary heat transduction along the length of the grating thereby varying the chirp of the grating.

2. The adjustable chirp grating of claim 1 wherein said heat-transducing body comprises a heat-generating body.

3. The adjustable chirp grating of claim 1 wherein said heat-transducing body comprises a heat removing body.

4. The adjustable chirp grating of claim 1 wherein said heat-transducing body is a composite body comprising a first resistive coating of substantially uniform resistance along the length of the grating and a second resistance coating which varies in resistance along the length of the grating.

5. An optical waveguide multiplexer comprising a grating according to claim 1.

6. An optical waveguide amplifier comprising a grating according to claim 1.

7. An optical waveguide communication system comprising a grating according to claim 1.

8. An adjustable chirp optical waveguide grating comprising:

a length of optical waveguide including an optical grating comprising a sequence of index perturbations;

disposed in thermal contact with said waveguide along the length of said grating, an electrically controllable heat-transducing body comprising a resistive coating with varies in electrical resistance along the length of the grating, said body responsive to an applied electrical signal to vary the temperature of the waveguide along the length of the grating thereby varying the chirp of the grating.

9. The adjustable chirp grating of claim 8 wherein said resistance increases along the length of said grating.

10. The adjustable chirp grating of claim 8 wherein said coating decreases in thickness along the length of said grating.

11. The adjustable chirp grating of claim 8 wherein said coating varies in composition along the length of said grating.

12. The adjustable chirp grating of claim 8 wherein said resistance monotonically increases along the length of the grating.

* * * * *